United States Patent
Lang (10) Patent No.: US 9,162,557 B2
(45) Date of Patent: Oct. 20, 2015

(54) DRIVE UNIT FOR A VEHICLE WHEEL

(71) Applicant: Guenter Lang, Wernau (DE)

(72) Inventor: Guenter Lang, Wernau (DE)

(*) Notice: Subject to any disclaimer, the term of this patent is extended or adjusted under 35 U.S.C. 154(b) by 286 days.

(21) Appl. No.: 13/783,253

(22) Filed: Mar. 2, 2013

(65) Prior Publication Data

US 2014/0245852 A1  Sep. 4, 2014

Related U.S. Application Data

(63) Continuation-in-part of application No. PCT/EP2011/065685, filed on Sep. 9, 2011.

(30) Foreign Application Priority Data

Sep. 9, 2010 (DE) .......................... 10 2010 037 435

(51) Int. Cl.
*B60K 1/00* (2006.01)
*B62M 6/75* (2010.01)

(52) U.S. Cl.
CPC .. *B60K 1/00* (2013.01); *B62M 6/75* (2013.01); *Y10T 74/19684* (2015.01)

(58) Field of Classification Search
CPC .......... B62M 6/60; B62M 25/08; B62M 6/45; B62M 6/50; B62M 6/55; B62M 6/90; B60L 11/007; B60L 11/1805; B60L 11/1864; B60L 11/1877; B60L 15/2072; B60L 2200/12; B60L 2220/44; B60L 2240/423; F16H 2001/325; F16H 2001/326
USPC ................. 180/65.1, 65.51, 65.6, 907, 206.1, 180/206.5, 206.8, 220
See application file for complete search history.

(56) References Cited

U.S. PATENT DOCUMENTS

| | | | | |
|---|---|---|---|---|
| 2,375,508 | A | | 5/1942 | Verots et al. |
| 4,671,524 | A | * | 6/1987 | Haubenwallner ............. 280/212 |
| 5,368,122 | A | * | 11/1994 | Chou ............................ 180/220 |
| 5,558,174 | A | * | 9/1996 | Avitan et al. .................... 180/60 |
| 5,755,304 | A | * | 5/1998 | Trigg et al. ................. 180/65.51 |
| 6,302,226 | B1 | * | 10/2001 | Kanno et al. ................... 180/6.5 |
| RE37,583 | E | | 3/2002 | Mayer et al. |
| 8,646,560 | B2 | * | 2/2014 | Chan .......................... 180/206.3 |
| 2004/0065495 | A1 | * | 4/2004 | Huang .......................... 180/220 |
| 2004/0144584 | A1 | * | 7/2004 | Phillips et al. ................ 180/205 |

FOREIGN PATENT DOCUMENTS

| | | |
|---|---|---|
| CA | 2 384 016 A1 | 11/2003 |
| DE | 44 04 518 A1 | 8/1995 |
| DE | 697 30 928 T2 | 11/2005 |
| FR | 867 489 A | 11/1941 |
| TW | 200 951 021 A | 12/2009 |

* cited by examiner

*Primary Examiner* — Paul N Dickson
*Assistant Examiner* — Bridget Avery
(74) *Attorney, Agent, or Firm* — R. S. Lombard; K. Bach

(57) ABSTRACT

The drive unit (19) according to the invention for light vehicles, in particular bicycles, comprises a wheel unit (20) and a motor unit (21). The wheel unit (20) includes a gear ring (27) and at least one, preferably two support tracks (31, 35) on which the motor unit (21), which is movably supported but circumferentially fixed to the frame (11), runs. In this way, a wheel-support arrangement for the motor unit (21) is provided. As a result, also with extreme light-weight designs as used in connection with bicycles even in sport applications, a correct engagement between the wheel mounted gear ring (27) and drive pinion (45) is achieved.

16 Claims, 10 Drawing Sheets

DRIVE UNIT FOR A VEHICLE WHEEL

CROSS-REFERENCE TO RELATED APPLICATION

This is a continuation-in-part application of pending international application PCT/EP2011/065685 filed Sep. 9, 2011 and claiming the priority of German Application No. 10 2010 037 435.0 filed Sep. 9, 2010.

BACKGROUND OF THE INVENTION

The invention resides in a drive unit for a wheel or wheels of a vehicle which is operated at least partially by an electric motor.

DE 20 2009 014 347 U1 discloses, for example, a bicycle which, in addition to the pedal crank drive, is provided with an electric motor which drives the rear wheel and which supports the pedal power of the driver. The electric motor is disposed in the rear wheel hub.

Also, DE 602 09 510 T2 which is mainly concerned with the control of an electric motor or a bicycle favors a wheel hub drive.

Although wheel hub drives are a common solution for the implementations of an auxiliary drive or possibly also a main drive, they have a substantial weight and they require either an exchange or a re-spoking of the wheel which is to be provided with a drive unit. They are therefore not particularly suitable for retro-fitting. In particular, a combination of a hub motor with a chain gear shift mechanism as it is provided generally with sporty bikes and which is favored by sport-oriented drives is difficult and possible only within limits.

Especially sport-oriented drivers often own valuable bikes which do not lend themselves to an installation of wheel hub drives of any type. The driver may also find it objectionable that the electric auxiliary drive prevents the wheel from rotating freely when the motor is not energized that is when the motor runs neither as motor nor as generator. This is particularly true for motors with permanent magnet excitation which are generally used because of their high efficiency.

Based hereon, it is the object of the present invention to provide an auxiliary electric drive for a vehicle wheel, in particular a bicycle especially for retrofitting.

SUMMARY OF THE INVENTION

The drive unit (19) according to the invention is for light vehicles, such as bicycles, and comprises a wheel unit (20) and a motor unit (21). The wheel unit (20) includes a gear ring (27) and at least one, preferably two support tracks (31, 35) on which the motor unit (21), which is movably supported but circumferentially fixed to the frame (11), runs. In this way, a wheel-support arrangement for the motor unit (21) is provided. As a result, also with extreme light-weight designs as used in connection with bicycles even in sport applications, a correct engagement between the wheel mounted gear ring (27) and drive pinion (45) is achieved.

The drive unit according to the invention includes a gear ring for mounting to the vehicle wheel, a guide profile also for mounting to the vehicle wheel, a motor carrier for connection to the vehicle frame as well as an electric motor supported by the motor carrier and having a drive pinion which is in engagement with the gear ring or which can be moved into and out of engagement with the gear ring. There is also at least one guide gear which is rotatably supported by the motor carrier and which runs on the guide profile.

With this concept a system is provided which can be easily retrofitted, for example, to bikes. The drive unit can be arranged at the front wheel, as well as, possibly additionally, at the rear wheel. The drive unit may also be at the right wheel side as well as at the left wheel side. If needed drive units may also be provided at both sides.

With the drive unit according to the invention, the motor carrier is movably supported by one or several guide wheels on the guide profile whereby an accurate engagement of the toothed drive pinion with the gear ring is ensured. This greatly facilitates on one hand the installation of the gear ring and the guide profile on the wheel and, on the other hand, the attachment of the motor carrier to the frame.

The position of the motor carrier is determined by the guide profile. If the drive wheel has been mounted with a slight eccentricity error or a sideward displacement, the motor carrier can follow the profile path without detrimentally affecting the engagement conditions between the drive pinion and the gear ring. Also dynamic deformation-caused (for example load-based) changes of the distances between wheel and frame parts can be easily accommodated in this way. As a result, the drive unit according to the invention is particularly suitable in sport-based applications such as, for example, mountain bikes without involving any limitations.

Furthermore, the drive unit according to the invention may be used in connection with bicycles with un-spring frames as well as with spring frames. The motor carrier is attached to the vehicle frame wherein "frame" includes also movable parts, spring supported parts, as well as rigidly mounted parts, as for example, a resiliently or a rigidly supported fork or a rear wheel pivot arm. By the use of the drive unit for driving the rear wheel and its connection to a spring support arm, a further advantage over a wheel hub drive is obtained. Even if the motor carrier including the motor has the same weight as a conventional wheel hub drive, the electric motor may be arranged closer to the pivot center (pivot arm bearing) of the rear wheel pivot arm as this is possible with a wheel hub motor. As a result, the unsprung mass effective at the rear wheel axis is reduced. The effect is substantial because of the square connection between the mass inertia moment and the distance of the center point of gravity of the un-spring mass from the center of rotation.

The drive unit according to the invention can easily be retrofitted and is self-guided since the motor carrier including the electric motor, the drive pinion and the guide wheel or wheels roll on the guide profile ring on which the wheels are guided. The guide profiles are formed by guide tracks on which the motor unit rolls along. To this end, the motor unit is relatively movably supported with respect to the vehicle frame. The movable support arrangement serves preferably only for the support of the drive moment.

The gear ring and/or the guide profile are connected to the wheel to be provided with the auxiliary drive by corresponding wheel connecting means, preferably for connection to the spokes. To this end, for example, clamping screws disposed in elongated openings may be provided via which the gear ring can be screwed to the spokes of the respective wheel. Other mounting may be provided in addition or alternatively.

Preferably the gear ring and the guide profile are provided on a disc-like carrier fitted to the wheel and are both formed on that carrier in a concentric manner. Preferably, the carrier has at least two guide profiles whose running surfaces face radially away from each other. The guide wheels of the motor unit running on these two different guide profiles can ensure not only the correct radial and axial orientations of the motor carrier but, in addition, also support the motor carrier against tilting moments which act, for example, on the motor unit when as a result of uneven travel surfaces vertical acceleration forces act on the vehicle and/or the motor unit.

Preferably, the drive connection between the electric motor and the gear ring can be separated as desired, for example, by disengaging the drive pinion gear from the gear ring, for example, by axial shifting of the drive pinion gear out of the gear ring or by opening a coupling or clutch provided for that purpose. In this way, the bike can be operated selectively without electric motor support or braking. This is desirable, in particular, for sport-oriented bikes, for example, when they wish to drive uphill without motor support, or when a cyclist has run out of battery power. Also, in this way, the braking effect of the drive unit can be eliminated on downhill stretches which however otherwise could be utilized for energy recuperation.

Further features and advantageous embodiments of the invention will be come apparent from the following description thereof with reference to the accompanying drawings. The following description is limited to the essential aspects of the invention and its application.

BRIEF DESCRIPTION OF THE DRAWINGS

It is shown in.

DETAILED DESCRIPTION OF THE PARTICULAR EMBODIMENTS

Figure 1:
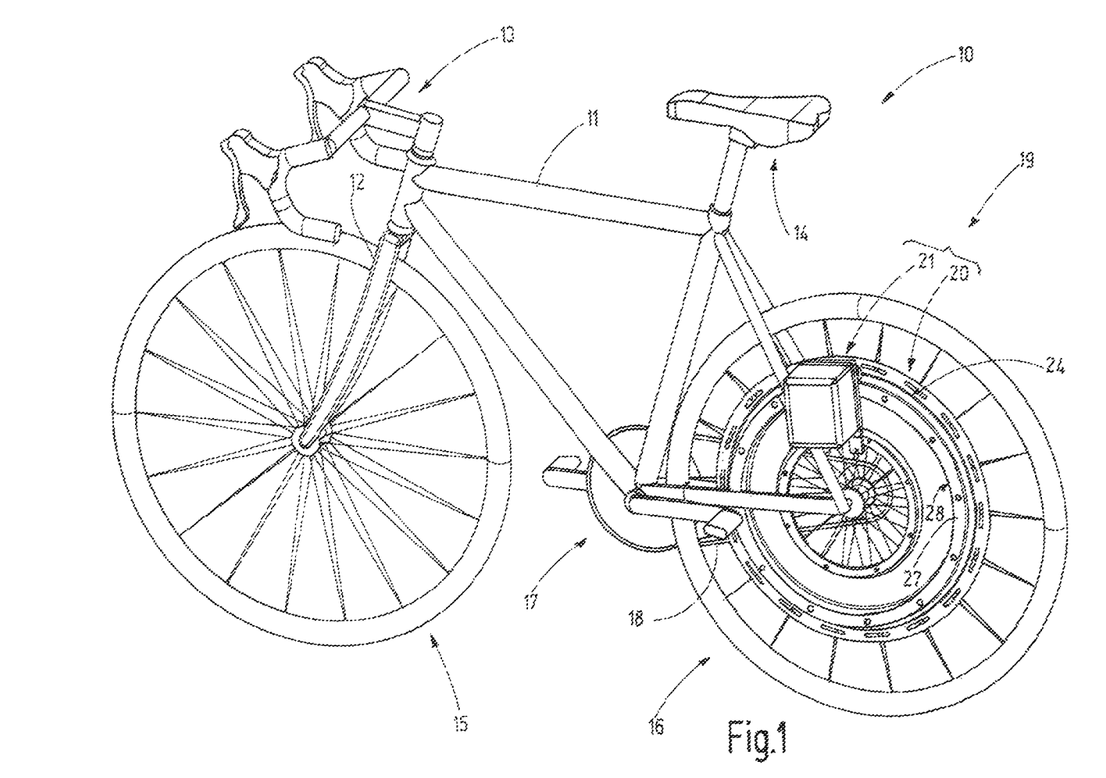
FIG. 1 is a bike provided with a drive unit according to the invention in a perspective view.

FIG. 1 shows a bike 10 which has the usual components, namely a frame 11, a fork 12, a handle bar 13, a seat 14, as well as, front wheel 15 and a rear wheel 16. For operator operation, a crank 17 is provided by which, via a chain 18 the rear wheel 16 can be driven. Preferable the bike 10 includes a gear shift transmission, which is not shown, preferably in the form of a chain gear shifter. However, it may also have a hub gear shifter which may be disposed in the rear wheel hub and/or the crank 17.

The front wheel 15 and/or the rear wheel 16 is provided with a drive unit 19 according to the present invention which may be in the form of an auxiliary drive or, if desired, as the main drive. That is that, it can be used at times or always as the sole drive. The drive unit 19 is an electric drive. An associated energy storage device is not shown in FIG. 1. This may be a suitable battery pack, such as, for example, a lithium-run battery or similar. In addition, the respective energy supply unit may include storage means which are suitable, in particular, for a temporary rapid interim storage of, for example, braking energy. Such storage means are, for example, electric double layer capacitors which are also known as super capacitors. An electric or electronic control unit may be provided for controlling the energy supply to the drive unit 19 and the return flow of energy generated in the drive unit 19 during braking or downhill driving. This energy flow can be controlled, depending on the design, for example, by means of control numbers arranged at the handle bar 13 or by activation of the crank 17, for example. If there, the drive or brake torque is sensed and utilized for the control.

The drive unit 19 comprises a wheel unit 20 and a motor unit 21. For clarification reference is made to FIGS. 1-3. In FIG. 3 the wheel unit 20 is shown transparent in order to show the motor unit 21 from the other side of the wheel.

The wheel unit 20 includes an annular disc 22 (FIGS. 2, 3) which is mounted for rotation with the rear wheel 16. The annular disc 22 is preferably arranged concentric with the axis of the rear wheel 16. By suitable wheel connecting means 23, the annular disc 22 is preferably connected to the spokes 24 of the rear wheel 16. As wheel connecting means 23, screws 25 may be used which extend through elongated openings 26 provided on the annular disc 22 and which have heads for clamping the spokes 24 into engagement with the disc 22 (FIG. 3).

Figure 2:
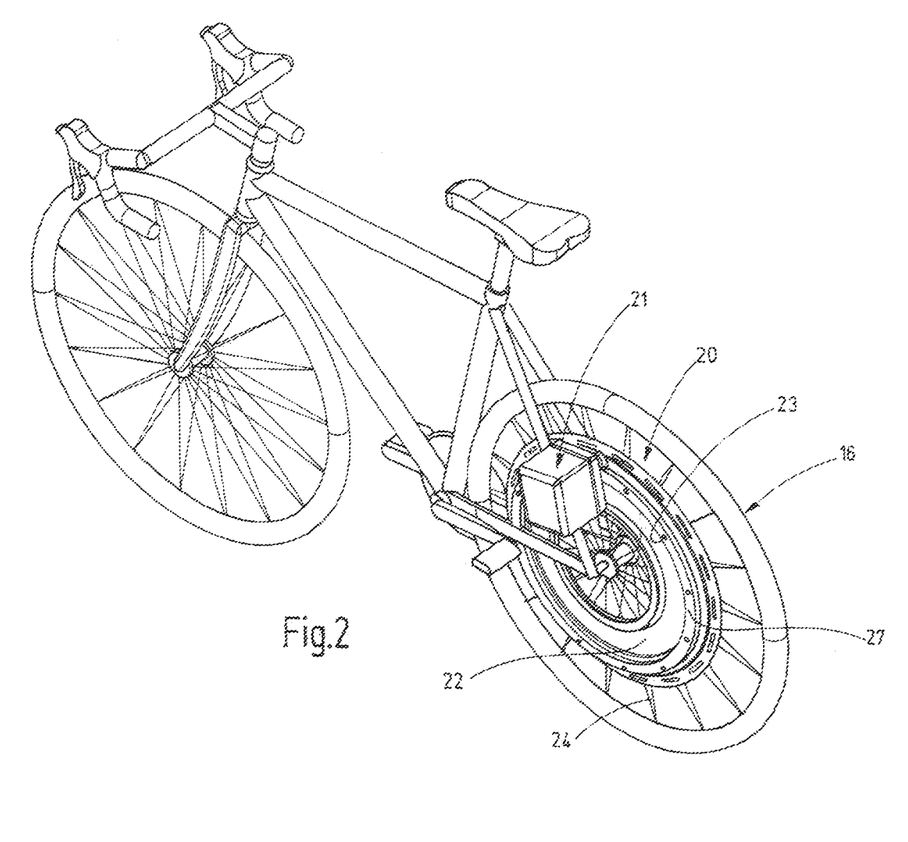
FIG. 2 is a bike as shown in FIG. 1 with a drive unit in another perspective view.
Figure 3:
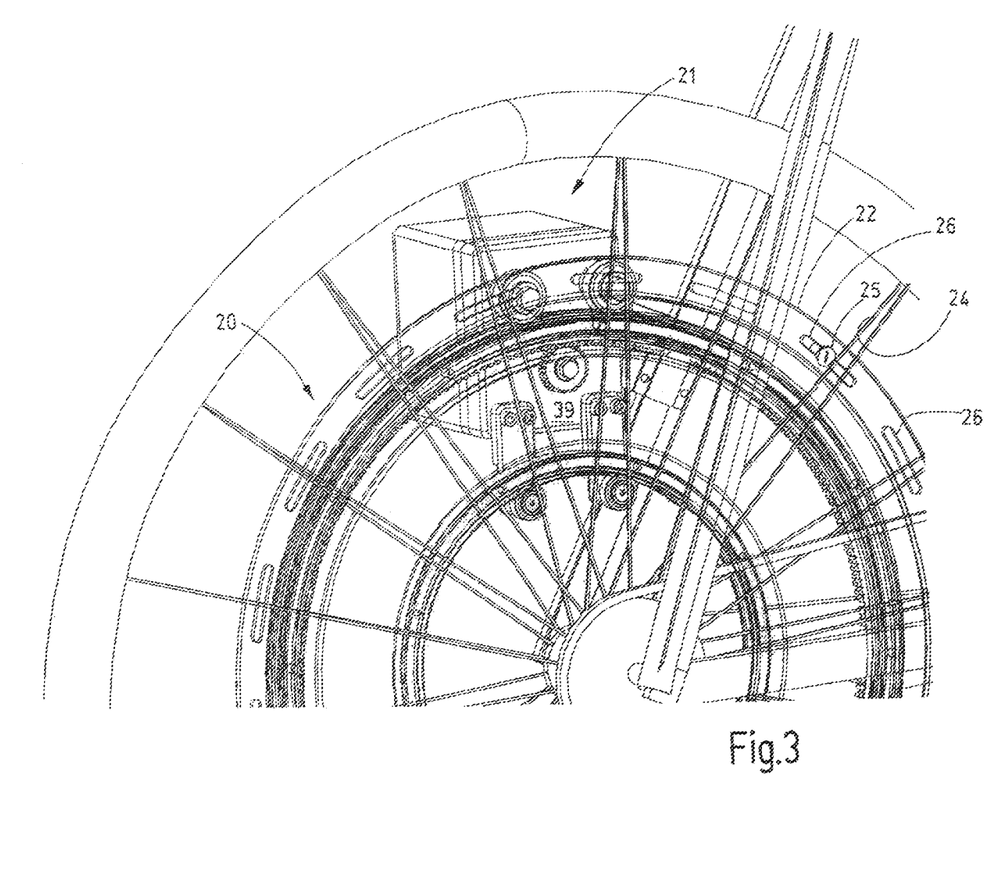
FIG. 3 is the rear wheel of the bike according to FIG. 2 in a schematic representation.
Figure 4:
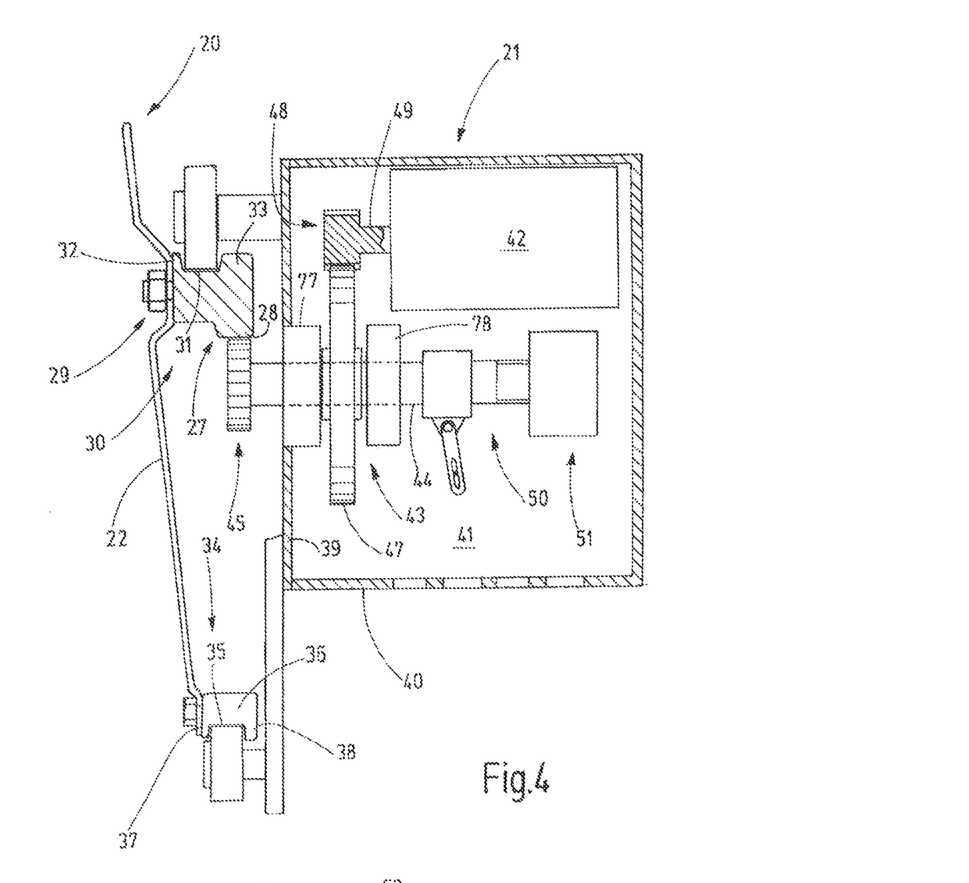
FIG. 4 is the drive unit in a schematic cross-sectional representation with the gear engaged.
Figures 5, 7:
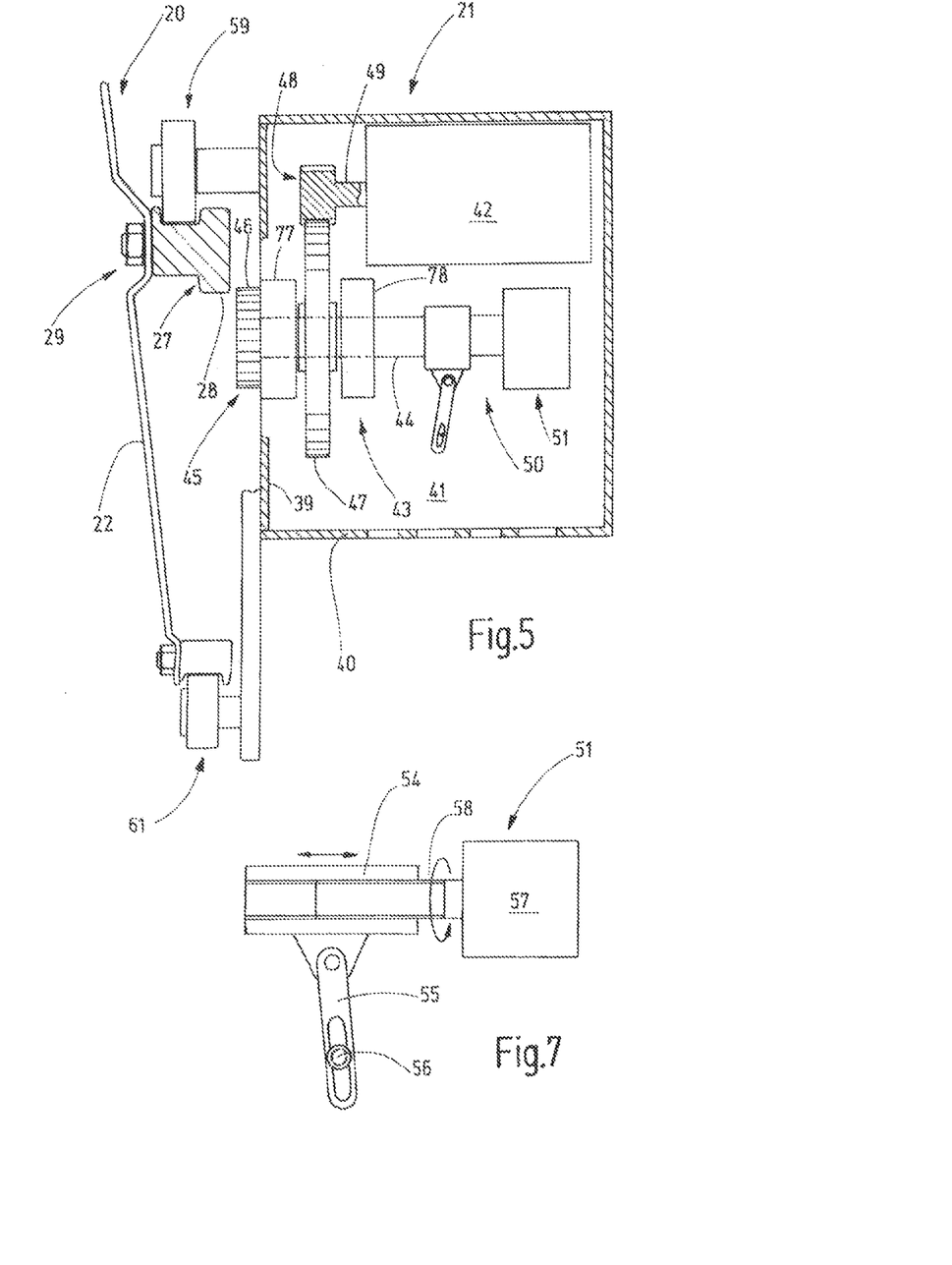
FIGS. 6 and 7 are details of the coupling mechanism of the drive unit in a schematic cross-sectional view.

As apparent already from FIGS. 1 and 2 and particularly from FIGS. 4 and 5, the annular disc 22 which is arranged concentrically with the wheel axis, carries a gear ring 27 which is provided in the exemplary embodiment with a radially inwardly facing gear structure 28. If desired, the gear structure 28 may, however, face radially outwardly. The gear ring 27 may also be formed integrally with the annular disc 22. However, as indicated in FIGS. 4 and 5, the gear ring 27 may be manufactured separately and connected to the annular disc 22 by suitable connecting means such as screws 29.

The wheel unit 20 further includes at least one guide profile 30 which in the shown exemplary embodiment is formed by a, for example, cylindrical support track 31, which may be arranged on the side of the gear ring 27 opposite the gear structure. The support track 31 may not have other than a cylindrical shape. In addition, it may be provided at one or both sides with rims 32, 33.

In the shown embodiment, the wheel unit 20 includes a second guide profile 34 which is formed by a second support track 35. The second guide profile 34 may be an annular element 36 which is connected to the annular disc 22. Preferably, the support track 35 thereof is cylindrical. But it may have another shape and may optionally be provided at one or both sides with guide runs 37, 38.

The gear ring 27 and the annular element 36 are preferably arranged concentrically. In the shown embodiment, the annular element 36 has a smaller diameter than the gear ring 27. However, the arrangement could be reversed.

Preferably, the two guide tracks 31, 35 are facing radially in opposite directions, that is, they face each other or face away from each other. The latter is shown in FIGS. 4 and 5.

The motor unit 21 is assigned to the wheel unit 20. The basic description thereto refers to FIGS. 3-5 and also to FIGS. 6-9.

The motor unit 21 comprises a motor carrier 39 provided with a cover 40 which may or may not have any support function. The interior space 41 surrounded by the motor carrier 39 and/or the cover encloses a drive means including at least an electric motor 42 and, if needed, a gear drive 43. Next to the motor carrier 39, a drive shaft 44 is rotatably supported which is driven directly by the motor 42 or via the gear drive 43 as shown in FIGS. 4 and 5. The drive shaft 44 carries at its end outside the interior space 41 a drive pinion 45 which is provided with a gear structure 46 filling the gear structure 28 of the gear ring 27.

For rotatably supporting the drive shaft 44 one or more bearings 77, 78 are provided which are shown in FIGS. 4 and 5 only schematically. Preferably, they permit an axial displacement of the drive shaft 44 while they support the drive shaft rotatably. The drive shaft 44 supports a spur gear 47 for rotation therewith, but in such a way that it is axially movable. To this end, the drive shaft 44 may be provided with an axial tooth structure which is engaged in an inner axial tooth structure of the spur gear 47. Other means for a rotational fixed coupling are known and may be used.

The spur gear 47 is in engagement with the motor pinion 48 which is disposed on the drive shaft 49 of the electric motor 42. In this way, the rotation of the output shaft 43 is transferred to the drive shaft 44 at a reducing ratio.

The motor unit 21 may further include a shift unit 50 which is set up to establish or interrupt the power flows from the electric motor 42 to the gear ring 27. The shift unit 50 acts as a coupling device by engaging or disengaging the drive pinion 45. The shift unit may also include at any point in the power flow path a coupling, for example, alternatively, a friction clutch or a form-locking coupling such as a gear coupling, a dog coupling or similar. In the exemplary embodiment, the power flow path is established or interrupted simply by engagement and disengagement of the gear structures 28 and 46. To this end, the drive shaft 41 is axially displaced to move the drive pinion 45 as desired into an engagement position according to FIG. 4 or a disengagement position according to FIG. 5.

Figure 6:
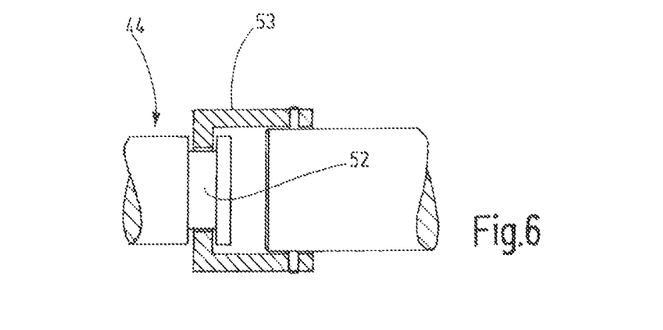

In the embodiment shown, the shift unit 50 provides for the axial displacement of the drive shaft 44. To this end, an axial shaft drive 51 is provided which may be based on various design principles. Only as an example, FIG. 6 shows how the end of the drive shaft 44 could be moved axially by means of a sleeve 53 which is not rotatable, but is in engagement with the drive shaft 44 via an annular groove 52. The sleeve 53 is axially firmly connected to the axial shaft drive 51. The axial shaft drive 51 may be, for example, in the form as shown in FIG. 7. In this exemplary embodiment, the axial shaft drive comprises a threaded-sleeve 54 which is held non-rotatably by a link 55 serving as a moment support. To this end, the link 55 is pivotally supported on the threaded sleeve 54 and also on the motor carrier 39 by means of a bolt 56 which extends through an elongated opening in the link 55. Other means for an axially movable, but rotational fixed engagement of the threaded sleeve 54 may be used.

For an axial displacement of the drive shaft 44, a motor 57 can be used whose output shaft 58 is provided with a thread onto which the threaded sleeve 54 is threaded. By rotation of the output shaft 58 clockwise or counter-clockwise, the threaded sleeve 54 as shown in FIG. 7 is moved to the left or to the right. In accordance therewith, the drive shaft 44 which is axially coupled to, but rotationally uncoupled from, the sleeve 54 can be axially moved in a controlled manner for establishing or interrupting the gear engagement between the drive pinion and the gear ring 27.

Figure 8:
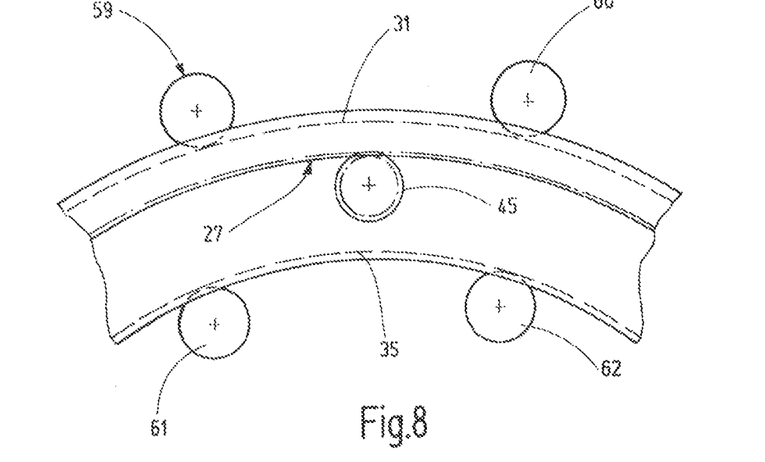
FIG. 8 is the drive unit in a schematic representation of the support arrangement thereof.

As shown in FIG. 3, as well as in FIG. 8, the motor unit 21 includes several, for example, four guide wheels 59, 60, 61, 62 which are supported on the motor carrier 39 rotatably about parallel axis. Two of the guide wheels 59, 60 are assigned to the support track 31. Two other guide wheels 61, 62 are assigned to the support track 35. The four guide wheels 59-62 are arranged, for example, at the corners of a quadrangle, for example, a quadrilateral, whose long sides extend in a direction outwardly from the center area of the wheel. In other words, the distance between the rollers and the support tracks 31, 35 is preferably greater than the distance between the support track rollers 59, 60 or respectively 61, 62 assigned to the same support tracks as shown particularly in FIG. 3. As indicated in FIG. 8, however, the arrangement may also be reversed.

Figure 9:
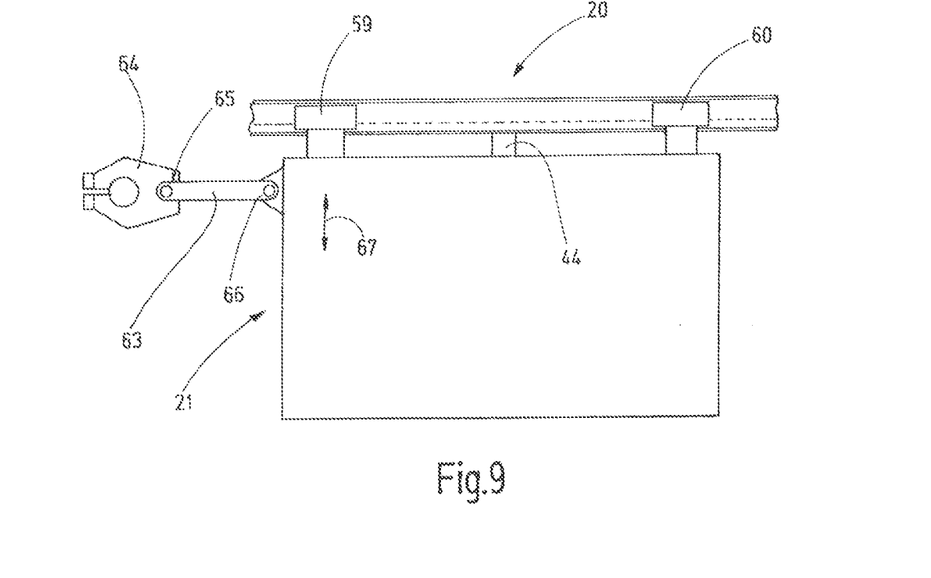
FIG. 9 is a top view of the drive arrangement according to FIG. 8.

As shown in FIG. 9, the motor unit 21 is preferably movably connected to the frame 11. To this end, for example, a linkage 63 is used which may be connected to a frame clamp 64. In place of the frame clamp 64 any other means may be provided which are suitable to connect the linkage 63 to the frame 11. Preferably the linkage 63 is connected to the frame clamp 64 or another mounting means by at least one, but preferably two joints 65, 66 in order to support the motor unit 21 with a degree of sideward freedom as indicated in FIG. 9 by an arrow 67. Furthermore, the joints 66, 65 may, if necessary, be of such a degree that the motor unit 21 also has a certain degree of freedom also in a radial direction. It is, therefore, supported preferably solely by the guide wheels 59-62 on the support tracks 31, 35.

The drive unit 19 described above operates as follows:

During operation, the motor unit 21 is supported on the wheel unit 20 by the guide wheels 59-62. The linkage 63 supports the motor unit 21 in the circumferential direction of the wheel unit 20. By a particular control action of the control unit 50, the drive pinion 45 may be moved into engagement with the gear ring 27 as shown in FIG. 4. If now the electric motor is energized, it rotates via the gear drive 43, the drive shaft 44 and in this way the gear ring 27. The bike 10 is driven in this way by the motor 42.

At the same time, the driver can additionally supply a drive torque to the rear wheel 16.

With the drive pinion 45 engaged the electric motor 42 may also be used for recuperating braking energy. The electric motor 42 is then operated in a generator mode. This mode of operation may be initiated by activating a bike brake, by back rotation of the pedal 17 or by other suitable measures.

It is also possible that the driver wishes that the drive unit is deactivated. To this end, for example, a manually operable shift means or an automatic may initiate the uncoupling of the motor unit 21. If the control unit, which is not disclosed in detail, receives such an uncoupling demand, it activates the shift motor 57 so as to move the drive shaft 44 from the position as shown in FIG. 4 to the position as shown in FIG. 5. As a result, the drive pinion 45 is moved out of engagement and separated from the gear ring 27. The bike can then be operated like a normal bike without any braking effects generated by the drive unit 19. This is particularly advantageous when the battery is empty or during downhill driving when neither a braking affect of the drive unit nor an additional drive effect is desired.

The shown drive unit may be provided with numerous variations. In the exemplary drive unit as disclosed herein, a good tilting movement support is provided for the motor unit 21 because of the relatively large radial distance between the support tracks 31, 35 on the wheel unit 20. When the bike is driven on a bad road where, as a result, vertical acceleration forces act on the motor unit 21, those forces can be accommodated by the support tracks 31, 35.

Figure 10:
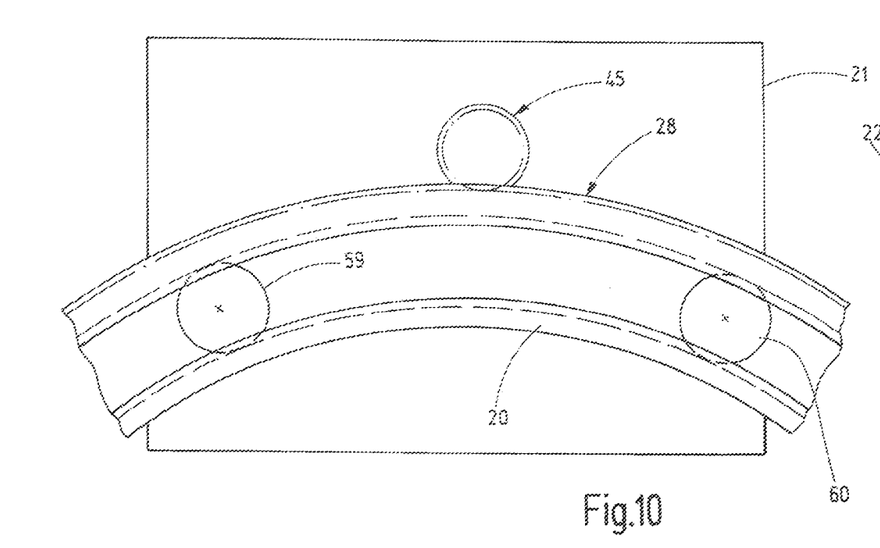
FIG. 10 is an alternative embodiment of the drive unit, according to the invention in a schematic side view.
Figure 11:
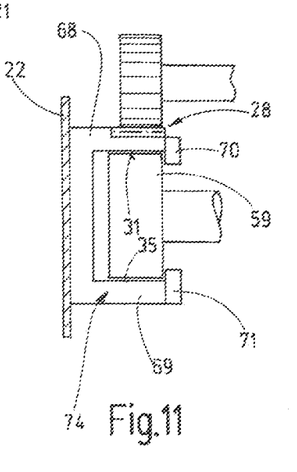
FIG. 11 is the drive unit according to FIG. 10 in a schematic sectional vertical cross-sectional representation.

If however, the least possible amount of guide wheels is to be used, an arrangement as shown in FIGS. 10 and 11 may be selected. There, on the annular disc 22, an annular body 74 may be arranged which has a U profile. The support tracks 31, 35 are arranged there on the legs 68, 69 which face each other. For supporting the drive moment of the motor unit 21 on the wheel unit 20, two guide wheels 59 and 60 are sufficient in this case. The gear structure 28 may be provided at the outer side of one of the legs 68, 69. The drive pinion may then be in engagement with this gear structure.

For better guidance of the guide wheels 59, 60 in the annular body 74, the legs 68, 69 may be provided at their ends facing the motor unit 21 with end rings 70, 71 which extend behind the guide wheels 59, 60. Otherwise the earlier description applies.

Figure 12:
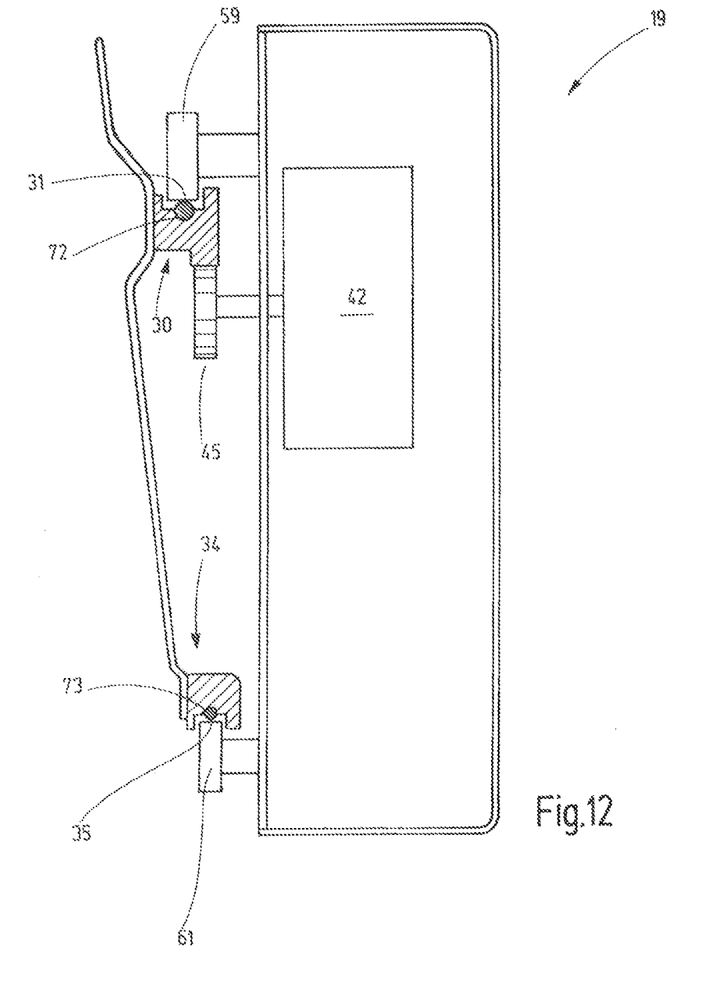
FIG. 12 is an embodiment of the drive unit representation of possible variants, in a schematic vertical sectional representation.

FIG. 12 shows an embodiment of the drive unit 19 wherein the two guide profiles 30, 34 include metal tracks 72, 73 on which the support tracks 31, 35 are formed. The metal tracks 72, 73 have preferably a round cross-sectional profile so that the rollers have only a small rolling resistance. The rollers may be cylindrical. But they may also be provided with a circumferential running groove. Metal tracks of this or a similar type can be used in connection with all embodiments of the invention. In this embodiment as well as in the other embodiments the pinion 45 may be directly driven by the motor 42 without an intermediate gear drive. The coupling and uncoupling of the motor can be achieved by a clutch which is not shown. The clutch may be of any suitable type. In particular, it may be a form-locking coupling. Preferably, however, the coupling is established by the axial movement of the pinion into and out of, engagement with the gear ring. To this end, the pinion may be disposed on a shaft relative to which it is rotationally fixed, but axially movable so that it can, for example, be manually moved. Alternatively, the whole unit comprising the motor 42 and the pinion 43 may be axially movable (preferably manually).

Figure 13:
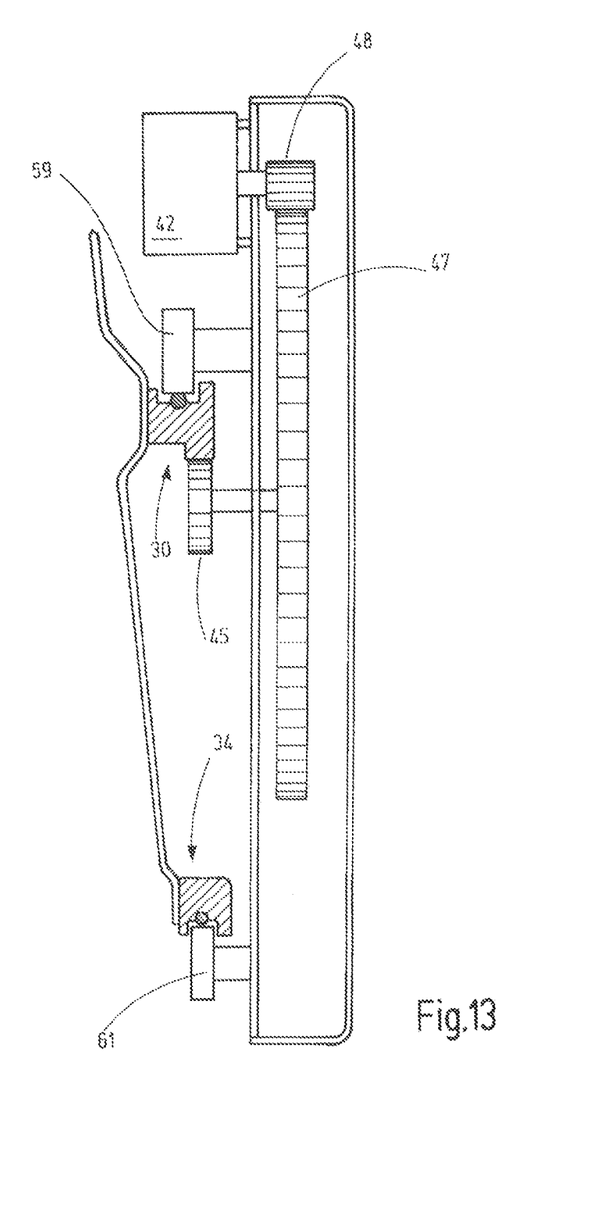
FIG. 13 is another embodiment of the drive unit showing another possible variant in a schematic vertical sectional representation; and, FIG. 14 is still another embodiment of the drive unit indicating other possible variants in a schematic vertical sectional representation.

As shown in FIG. 13, the arrangement can be such that the motor 42 is arranged in vertical alignment with the guide profiles 30, 34. Its center of gravity is then disposed essentially in the same vertical plane as the support profiles 30, 34. As a result, the vertical shocks effective on the vehicle are not resulting in any bending moments which need to be accommodated by the support structure. The guide arrangement comprises the guide profiles 30, 35 and the rollers running on the guide profiles. Engagement and disengagement is again achieved by a suitable clutch or (preferably manual) displacement of one of the gears, in particular the gear 45. For the design of the rollers 59, 61 and the guide profiles 30, 34 any of the previously mentioned possibilities may be used.

Figure 14:
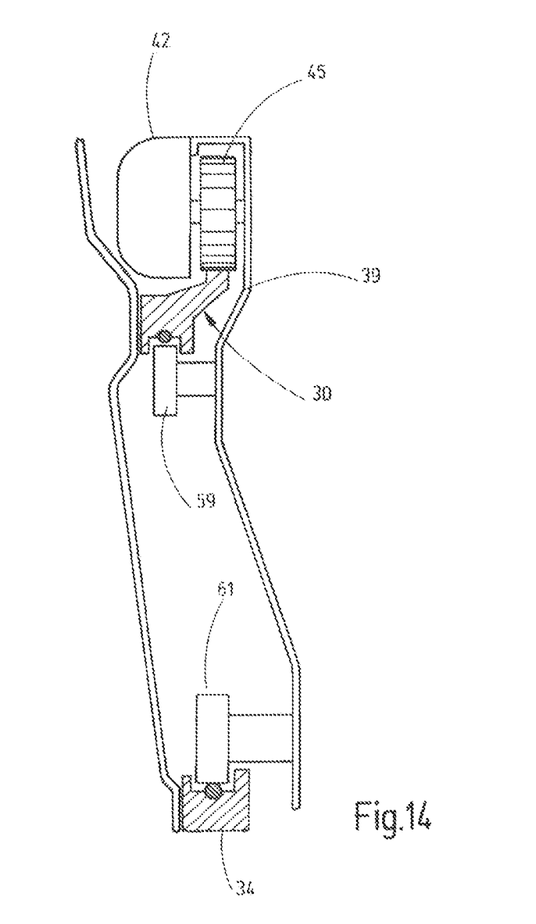

FIG. 14 shows that also other variants are possible. For example, the rollers 59, 61 may be arranged between the guide profiles 30, 34. The gear ring 28 may be arranged at the radially outer side of the outer guide profile 30. The motor 42 may be arranged adjacent the wheel as shown that is between the motor carrier 39 and the wheel as shown or at the side of the motor carrier opposite the wheel. For the engagement and disengagement, any of the possibilities mentioned earlier may be used. The same is true with regard to the design of the rollers 59, 61 and the guide profiles 30, 34.

The embodiments may also be changed so that the gear structure 28 is arranged in each case at the radially opposite side of the respective guide profile 30, 34. In another possible variant, the gear structure 28 may be arranged alternatively in each case at the other of the two guide profiles 30, 34. In all embodiments, the rollers 59, 61 (and all others) are in contact with the respective support tracks 31, 35 without pretension or with some play. This reduces the rolling resistance.

The drive unit 19 according to the invention for light vehicles, in particular bikes, comprises a wheel unit 20 and a motor unit 21. The wheel unit 20 comprises a gear ring 27 and at least one, preferably two guide tracks 31, 35 on which the motor unit 21, which is otherwise movably supported but linked to the frame, rolls along. In this way, the motor unit 21 is movably supported by the wheel unit 20. In this way, even with an extreme light-weight construction as it is often the case with bikes and with sport-type use, a proper gear engagement between the wheel-side gear ring 27 and the drive-side drive pinion 45 is always achieved.

LISTING OF REFERENCE NUMERALS 10 bike
11 frame
12 fork
13 handle bar
14 seat
15 front wheel
16 rear wheel
17 crank
18 chain
19 drive unit
20 wheel unit
21 motor unit
22 annular disc
23 wheel connecting means
24 spokes
25 screws
26 elongated openings
27 gear ring
28 gear structure of the gear ring 27
29 screws
30 guide profile
31 support track
32 rim
33 rim
34 guide profile
35 support track
36 annular element
37 rim
38 rim
39 motor carrier
40 cover
41 inner space
42 electric motor
43 gear drive
44 drive shaft
45 drive pinion
46 gear structure of the drive pinion 45
47 spur gear
48 motor pinion
49 drive shaft of the electric motor 42
50 shift unit
51 axial shaft drive
52 annular groove
53 sleeve
54 manual support
55 link
56 bolt
57 shift motor
58 output shaft
59 first guide wheel of support track 31
60 second guide wheel of support track 31
61 first guide wheel of support track 35
62 second guide wheel of support track 35

63 linkage
64 frame clamp
65 joint
66 joint
67 arrow
68 leg
69 leg
70 end ring
71 end ring
72 metal track
73 metal track
74 annular body
77 bearing
78 bearing

What is claimed is:

1. Drive unit (19) for a vehicle wheel (16), comprising:
    a gear ring (27) provided with a gear structure (28) and with wheel connecting means (23) for connection to the vehicle wheel (16);
    at least one guide profile (30) which is arranged concentrically with the gear ring (27);
    a motor carrier (39) which is provided with a support means (54) for connection to a vehicle frame (11);
    an electric motor (42) which is arranged on a motor carrier (39), a drive pinion (45) connected to the electric motor (42) so as to be driven, which has a gear structure (46) corresponding to the gear structure (28) of the gear ring (27) and which is in engagement with the gear ring (27) driving operation; and,
    at least one guide wheel (59) mounted on the motor carrier (39) and supported on the at least one guide profile (30) for supporting the drive unit (19) directly on the vehicle wheel (16).

2. Drive unit according to claim 1, wherein the vehicle wheel (16) includes wheel spokes (24), the wheel connecting means (23) are in operative attachment to the wheel spokes (24).

3. Drive unit according to claim 1, the guide profile (30) and the guide wheel (59) are arranged at a side of the gear ring (27) facing away from the gear structure (28).

4. Drive unit according to claim 1, wherein at least two guide wheels (59, 61) are provided which are in operative arrangement with different, but concentrically arranged guide profile (30) and a second guide profile (34).

5. Drive unit according to claim 1, wherein the drive pinion (45) is supported so as to be movable between an engagement position in which it is in engagement with the gear ring (27) and a free-wheeling position in which it is out of engagement with the gear structure (28) of the gear ring (27).

6. Drive unit according to claim 1, wherein a clutch is arranged between the motor (42) and the gear ring (27).

7. Drive unit according to claim 1, wherein the motor carrier (39) is connected to the vehicle frame (11) via the support means (54) so as to be movable relative to the frame (11).

8. Drive unit according to claim 1, wherein the support means (54) is a link (55) which has at least one pivot joint (65).

9. Drive unit according to claim 1, wherein the vehicle wheel is particularly of an electrically driven or supported bicycle (10).

10. Drive unit according to claim 4, wherein to at least one of the two guide profiles (30, 34) at least two guide wheels (59, 60; 61, 62) are operatively arranged.

11. Drive unit according to claim 4, wherein the two guide profiles (30, 34) respectively include support tracks (31, 35).

12. Drive unit according to claim 5, wherein a shift unit (50) for axial movement of the drive pinion (45) is provided for moving the pinion (45) into and out of engagement with the gear ring (27).

13. Drive unit according to claim 12, the drive pinion (45) and the electric motor (42) are arranged so as to be axially movable together.

14. Drive unit according to claim 8, wherein the link (55) extends essentially tangentially with regard to the gear ring (27).

15. Drive unit according to claim 11, wherein the two guide profiles (30, 34) respectively include metal tracks (72, 73) for forming the support tracks (31, 35).

16. Drive unit according to claim 15, wherein the metal tracks (72, 73) have a round cross-sectional profile.

* * * * *